United States Patent
Arras et al.

(10) Patent No.: US 7,340,476 B2
(45) Date of Patent: Mar. 4, 2008

(54) METHOD FOR ONLINE ANALYTICAL PROCESSING (OLAP)

(75) Inventors: Patrick Arras, Braunschweig (DE); Alfons Steinhoff, Herrenberg (DE)

(73) Assignee: International Business Machines Corporation, Armonk, NY (US)

(*) Notice: Subject to any disclaimer, the term of this patent is extended or adjusted under 35 U.S.C. 154(b) by 472 days.

(21) Appl. No.: 10/530,936

(22) PCT Filed: Sep. 11, 2003

(86) PCT No.: PCT/EP03/50620

§ 371 (c)(1),
(2), (4) Date: Apr. 8, 2005

(87) PCT Pub. No.: WO2004/036456

PCT Pub. Date: Apr. 29, 2004

(65) Prior Publication Data

US 2006/0010147 A1    Jan. 12, 2006

(30) Foreign Application Priority Data

Oct. 18, 2002   (EP) .................................. 02023362

(51) Int. Cl.
*G06F 7/00*   (2006.01)
(52) U.S. Cl. ..................................... 707/102; 707/100
(58) Field of Classification Search .......... 707/1–104.1
See application file for complete search history.

(56) References Cited

U.S. PATENT DOCUMENTS

| | | | | |
|---|---|---|---|---|
| 5,767,854 A | 6/1998 | Anwar | ....................... | 345/355 |
| 5,787,279 A * | 7/1998 | Rigoutsos | ....................... | 707/6 |
| 5,875,108 A * | 2/1999 | Hoffberg et al. | ............... | 700/17 |
| 5,978,796 A | 11/1999 | Malloy et al. | .................. | 707/3 |
| 6,003,036 A | 12/1999 | Martin | ....................... | 707/102 |
| 6,049,804 A | 4/2000 | Burgess et al. | ............. | 707/100 |
| 6,334,125 B1 * | 12/2001 | Johnson et al. | ................. | 707/3 |
| 6,427,123 B1 | 7/2002 | Sedlar | ........................... | 702/2 |
| 2002/0095421 A1 * | 7/2002 | Koskas | ....................... | 707/100 |

\* cited by examiner

*Primary Examiner*—Don Wong
*Assistant Examiner*—Linh Black
(74) *Attorney, Agent, or Firm*—Schmeiser, Olsen & Watts; William H. Steinberg

(57) ABSTRACT

Disclosed are a method and system for generating user-defined pivot views of data records contained in a database where, as depicted in FIG. 2a, an underlying real facts table at first is extended by continuous index values (200) which provides a continuous numbering of the facts from '1' to 'x' (x=20 in the present example). In the resulting pivot view shown in FIG. 2b, in each cell (210) the indices of those facts are presented which sales value has to be summed-up in the corresponding cell. The pivot view is generated by means of a sequence vector. The underlying sequence vector for the pivot view in FIG. 2b is depicted in FIG. 2c and consists of two columns (260, 270), the left column (260) containing continuous numbers from again '1' to 'x' and the right column (270) containing the mentioned index values (275) depicted in FIG. 2a in an ordered arrangement that enables sequentially building-up the pivot view of FIG. 2b.

12 Claims, 11 Drawing Sheets

Pivot Sequence

| Pseq | Fact# | Start | NewGrp |
|---|---|---|---|
| 1 | 15 | True | 1 |
| 2 | 13 | True | 2 |
| 3 | 8 | True | 3 |
| 4 | 18 | True | 3 |
| 5 | 2 | True | 4 |
| 6 | 11 | True | 5 |
| 7 | 14 | True | 6 |
| 8 | 12 | True | 7 |
| 9 | 17 | | 7 |
| 10 | 7 | True | 8 |
| 11 | 16 | | 8 |
| 12 | 6 | True | 9 |
| 13 | 20 | True | 10 |
| 14 | 9 | True | 11 |
| 15 | 19 | True | 12 |
| 16 | 5 | True | 13 |
| 17 | 3 | True | 14 |
| 18 | 10 | | 14 |
| 19 | 4 | True | 15 |
| 20 | 1 | True | 16 |

FIG. 10

Pivot View

| Customer | Article | Sales Q1 | Q2 | Q3 | Q4 |
|---|---|---|---|---|---|
| Brown | a0815 | 50 | 30 | | 80 |
| | a4711 | 60 | | 10 | 30 |
| Jones | a0815 | 110 | | 80 | |
| | a4711 | 50 | 10 | | 20 |
| Miller | a4711 | 70 | 70 | 30 | 30 |

150 — Pivot View
160 — Article
170 — columns
140 — values

FIG. 1B

Real Facts

| Customer | Article | Month | Sales |
|---|---|---|---|
| Miller | a4711 | Jul | 30 |
| Brown | a4711 | Jan | 60 |
| Miller | a4711 | Jan | 30 |
| Miller | a4711 | May | 70 |
| Miller | a0815 | Dec | 30 |
| Jones | a4711 | Jan | 50 |
| Jones | a0815 | Aug | 50 |
| Brown | a0815 | Oct | 60 |
| Jones | a0815 | Nov | 20 |
| Miller | a4711 | Mar | 40 |
| Brown | a4711 | Sep | 10 |
| Jones | a0815 | Feb | 60 |
| Brown | a0815 | Apr | 30 |
| Brown | a0815 | Dec | 30 |
| Brown | a0815 | Feb | 50 |
| Jones | a0815 | Sep | 30 |
| Jones | a4711 | Mar | 50 |
| Brown | a0815 | Nov | 20 |
| Miller | a0815 | Apr | 70 |
| Jones | a4711 | Jun | 10 |

100 — Real Facts
110 — Article
120 — Month
130 — Sales

| Real Fact# | Customer | Article | Month | Sales |
|---|---|---|---|---|
| 1 | Miller | a4711 | Jul | 30 |
| 2 | Brown | a4711 | Jan | 60 |
| 3 | Miller | a4711 | Jan | 30 |
| 4 | Miller | a0815 | May | 70 |
| 5 | Miller | a0815 | Dec | 30 |
| 6 | Jones | a4711 | Jan | 50 |
| 7 | Jones | a0815 | Aug | 50 |
| 8 | Brown | a0815 | Oct | 60 |
| 9 | Jones | a4711 | Nov | 20 |
| 10 | Miller | a4711 | Mar | 40 |
| 11 | Brown | a0815 | Sep | 10 |
| 12 | Jones | a0815 | Feb | 60 |
| 13 | Brown | a4711 | Apr | 30 |
| 14 | Brown | a4711 | Dec | 30 |
| 15 | Brown | a0815 | Feb | 50 |
| 16 | Jones | a0815 | Sep | 30 |
| 17 | Jones | a0815 | Mar | 50 |
| 18 | Brown | a0815 | Nov | 20 |
| 19 | Miller | a0815 | Apr | 70 |
| 20 | Jones | a4711 | Jun | 10 |

FIG. 2B

Pivot View

| Customer | Article | Sales Q1 | Q2 | Q3 | Q4 |
|---|---|---|---|---|---|
| Brown | a0815 | 15 | 13 |  | 8,18 |
| Brown | a4711 | 2 |  | 11 | 14 |
| Jones | a0815 | 12,17 |  | 7,16 |  |
| Jones | a4711 | 6 | 20 |  | 9 |
| Miller | a0815 |  | 19 | 4 | 5 |
| Miller | a4711 | 3,10 |  |  | 1 |

FIG. 2C

Pivot Sequence

| PSeq | Fact# |
|---|---|
| 1 | 15 |
| 2 | 13 |
| 3 | 8 |
| 4 | 18 |
| 5 | 2 |
| 6 | 11 |
| 7 | 14 |
| 8 | 12 |
| 9 | 17 |
| 10 | 7 |
| 11 | 16 |
| 12 | 6 |
| 13 | 20 |
| 14 | 9 |
| 15 | 19 |
| 16 | 5 |
| 17 | 3 |
| 18 | 10 |
| 19 | 4 |
| 20 | 1 |

METHOD FOR ONLINE ANALYTICAL PROCESSING (OLAP)

BACKGROUND OF THE INVENTION

The present invention generally concerns database management systems performed by computers, in particular to corresponding OLAP (OnLine Analytical Processing) and Data Warehouse applications. More specifically, the invention relates to a method and system for generating user-defined presentations or views of data records contained in such a database management system. Even more specifically, the invention is related to database management systems with very large number of data records.

Data Warehouse and Online Analytical Processing (OLAP) applications have highlighted the need for a fast way to store and retrieve multidimensional data. A data warehouse is a central repository for all or significant parts of the data that an enterprise's various business systems collect. Sometimes the term "information warehouse" is used instead of. Typically, a data warehouse is housed on an enterprise mainframe server. Data from various online transaction processing (OLTP) applications and other sources is selectively extracted and organized on a data warehouse database for use by analytical applications and user queries. Data warehousing emphasizes the capture of data from diverse sources for useful analysis and access, but does not generally start from the point-of-view of the end user or knowledge worker who may need access to specialized, sometimes local databases. The latter technology is commonly known as the data mart, data mining, Web mining, and a decision support system (DSS) are three kinds of applications that can make use of a data warehouse.

OLAP is computer processing that enables a user to easily and selectively extract and view data from different points-of-view. For example, a user can request that data be analyzed to display a spreadsheet showing all of a telecommunication company's mobile phone products sold in a country in a specific month of the year, compare revenue figures with those for the same products in the preceding month, and then see a comparison of other product sales in that country in the same time period.

To facilitate this kind of analysis, OLAP data is stored in a multidimensional database. Whereas a relational database can be thought of as two-dimensional, a multidimensional database considers each data attribute, often called "data key", such as product, geographic sales region, and time period as a separate "dimension." OLAP software can locate the intersection of dimensions, e.g. 'all products sold in the Eastern region above a certain price during a certain time period', and display them. Attributes such as time periods can be broken down into sub-attributes.

Like a data warehouse, OLAP can be used for data mining or the discovery of previously un-discerned relationships between data items. An OLAP database does not need to be as large as a data warehouse, since not all transactional data is needed for trend analysis. Using Open Database Connectivity (ODBC), data can be imported from existing relational databases to create a multidimensional database for OLAP.

As mentioned above, OLAP functionality is determined mainly by the dynamic multidimensional analysis of consolidated data supporting end user analytical and navigational activities including:

Calculations and modeling applied across dimensions, through hierarchies and/or across members;
Trend analysis over sequential time periods;
Slicing subsets for on-screen viewing;
Drill-down to deeper levels of consolidation;
Reach-through to underlying detail data; and
Rotation to new dimensional comparisons in the viewing area.

OLAP is often implemented in a multi-user client/server environment and attempts to offer consistently rapid response to database access, regardless of database size and complexity. The data delivered by such a database access are commonly presented to the end user by way of cross-table or pivot presentations or views of parts or even the entire contents of the underlying database which is mainly defined by the arrangement of cells of presented data records. This arrangement, in the typical case of using a flat computer monitor, has to be two-dimensional. Another example for a pivot presentation is a two-dimensional data array provided in a computer memory, database or the like.

Each data record of the underlying database consists of a number of data attributes or data keys, as illustrated in FIG. 1 wherein the dimension of the data records and thus that of the entire database is determined by the number of data keys, likewise.

A particular pivot presentation generally depends on pre-specified user preferences for the particular key arrangement of the contents of the data records, like customer information, corresponding articles sold to those customers and the time of sell for each article. Hereby it is often required to aggregate the contents of different data records or data key elements of given data records in a cell of the pivot presentation.

There exists a number of approaches for generating pivot presentations of data records in a multi-dimensional database. A first approach is using well-known Simple Query Language (SQL) in order to obtain user-defined pivot views of an existing database by means of a database query. But calculation of a pivot view in a large database requires considerable processing resources since all the data records stored in the database have to be accessed in order to check if they meet the underlying query conditions.

As a second approach, there are known OLAP software tools where data records are processed internally using hyper-cubic data structures thus requiring large storage volumes in order to store the intermediately generated OLAP information.

According to a third approach, the above discussed first and second approach are combined in order to provide a corresponding hybrid concept. But the third approach, too, is disadvantageous insofar as the performance is considerably varying and strongly dependent on the actual pivot presentation.

SUMMARY OF THE INVENTION

It is therefore an object of the present invention to provide a computer-implemented method and system for generating user-defined n-dimensional matrix presentations or views of data records contained in a database management system that are more efficient and thus perform faster than according prior art approaches and which avoid the above mentioned disadvantages of the above discussed prior art approaches.

Another object is to provide an according a method and system which can be used in an online analytical processing (OLAP) environment with suitable response times.

Still another object is to provide an according method and system requiring only minimum processing resources for generating those matrix presentations or views.

The above objects are attained by the features of the independent claims. Advantageous embodiments are subject matter of the subclaims.

The underlying idea of the invention is serialization of the underlying data records of the multi-dimensional database, e.g. arranged in an m-dimensional facts table, in form of a continuing data sequence. This sequence hereby consists of placeholder values, preferably integer numbers, wherein each of these placeholder values is linked to the underlying unchanged m-dimensional facts table by means of reference tables or vectors. However, the dimension n of the matrix presentation can be equal to said dimension m.

The underlying mechanism particularly comprises the steps of transforming the contents of all data value fields belonging to a definite data key to index values, except the record numbers as index values, and performing all sorting steps for generation of the final matrix presentation based on said index values, i.e. the entire sorting mechanism or whole sorting engine is using only these index values.

It should be mentioned that the "cardinality" of said n-dimensional matrix presentation, in the exemplary two-dimensional case, means the number of columns and rows of that two-dimensional matrix. In the case of more dimensions i.e. n >=2, the cardinality defines the necessary presentation resources accordingly.

In a preferred embodiment, data records to be presented in a single cell of an underlying matrix presentation, e.g. a row of a 2-dimensional presentation matrix, are continuously arranged in a subsequence comprising respective of said placeholder values. These single cells of said pivot presentation thus are generated using corresponding of said subsequences. As a result, for the pivot view of a cell a data subsequence of the whole sequence of data records can be used. Each of these cells needed for the user-specified pivot presentation is particularly defined a starting point in the sequence by which the required data of the facts table to be presented are accessed.

The final matrix presentation is generated using that data sequence whereby referring to the n-dimensional facts table only using the mentioned placeholder values. The matrix presentation, in other words, thus is obtained using a virtual 2-dimensional matrix.

The mentioned data sequence, in the preferred embodiment, is realized by means of a linear vector that comprises the above mentioned sequence preferably consisting of integer numbers. Hereby, the data records of each dimension (group), e.g. included in the facts table, are newly arranged for the respective user-defined pivot configuration by means of the sequence vector. Since access to the real data records using that sequence vector is accomplished thereby using data record index numbers, calculation of the cells to be used for the particular pivot presentation, i.e. the columns and rows to be presented in a particular pivot view, can be performed in real time i.e. online, i.e. without any delay or only with very short delay or response times for the user.

According to another embodiment, the underlying facts table, at first, is converted into a reference table based on which the sequence is generated. In order to determine transitions between two of said dimensions of data records, in still another embodiment, a count vector is utilized.

The mechanism according to the invention therefore does not require pre-processing of the data records of a database for the purpose of calculating possible pivot presentations, e.g. by way of pre-aggregation of all data records which requires considerable data processing and data storage resources.

In addition, due to the intermediate serialization step, the amount of data records, and thus the database size, can be expanded without any impacts on the possible pivot presentations (views) wherein the required processing times scale linearly with the size of the underlying database. Hereby a first dimension is mapped onto at least a second dimension of said at least two dimensions of data records. Thus arbitrary dimensions of data records of the database can be mapped onto each other thus enabling extension of an existing database by inserting further dimensions of data records or even complete hierarchies thereof.

In contrast to the above discussed prior art approaches, the mechanism according to the present invention does not require operations like comparisons between large data sets in order to calculate a pivot presentation.

Further, a particular data record dimension of the database can be used more times in different aggregation stages of a pivot presentation without any runtime problems. Due to use of only vector operations for subsequent different pivot views of a given database, preceding generated sequences of data records for providing a user-defined pivot view are kept valid for the following pivot views and thus subsequently following pivot views are always deduced from an existing pivot view thus not destructing an already existing pivot view.

In a further aspect of the invention, a selected 2-dimensional pivot presentation is commonly based on a virtual 2-dimensional matrix that is determined by the number of columns and rows. The proposed pivot processing mechanism thus provides, for a given pivot presentation, the amount of columns and rows and, in addition, the intersectional points of the columns and rows in the mentioned sequence of subsequences. Thus presentation of a cell of the virtual matrix can be simply accomplished by means of a column and row index of the cell.

An arbitrary user-defined pivot presentation thus can be generated very fast out of database records since the pivot presentation is generated or calculated using only pure referencing and counting techniques and simple linear (one-dimensional) vector operations executed on integer values.

It is emphasized that the pivot presentation mechanism according to the invention is not limited to 2-dimensional but can also be applied to n-dimensional pivot presentations. In the n-dimensional case, however, the above mentioned sequence vector is (n−1)-dimensional.

BRIEF DESCRIPTION OF THE DRAWINGS

In the following, the present invention is illustrated in greater detail by making reference to the accompanying drawings from which further features and advantages of the invention become evident.

In the drawings,

FIG. 1$a,b$ depict an exemplary real facts table and a corresponding pivot view as known in the prior art;

FIG. 2$a$-$c$ illustrate basic principles of the mechanism for generating pivot views in accordance with the present invention by way of tables;

FIG. 3$a$-$c$ illustrate further details of the mechanism for generating pivot views according to the present invention;

FIG. 5-6$g$ show overview table diagrams for illustrating how real facts data are sorted in order to obtain a desired pivot view in accordance with the present invention;

FIG. 7 depicts a final result permutation table according to the present invention; and FIG. 8-10 depict a final sorting step in accordance with the present invention.

DETAILED DESCRIPTION OF THE PREFERRED EMBODIMENT

Figures 4A, 4B, 4C:
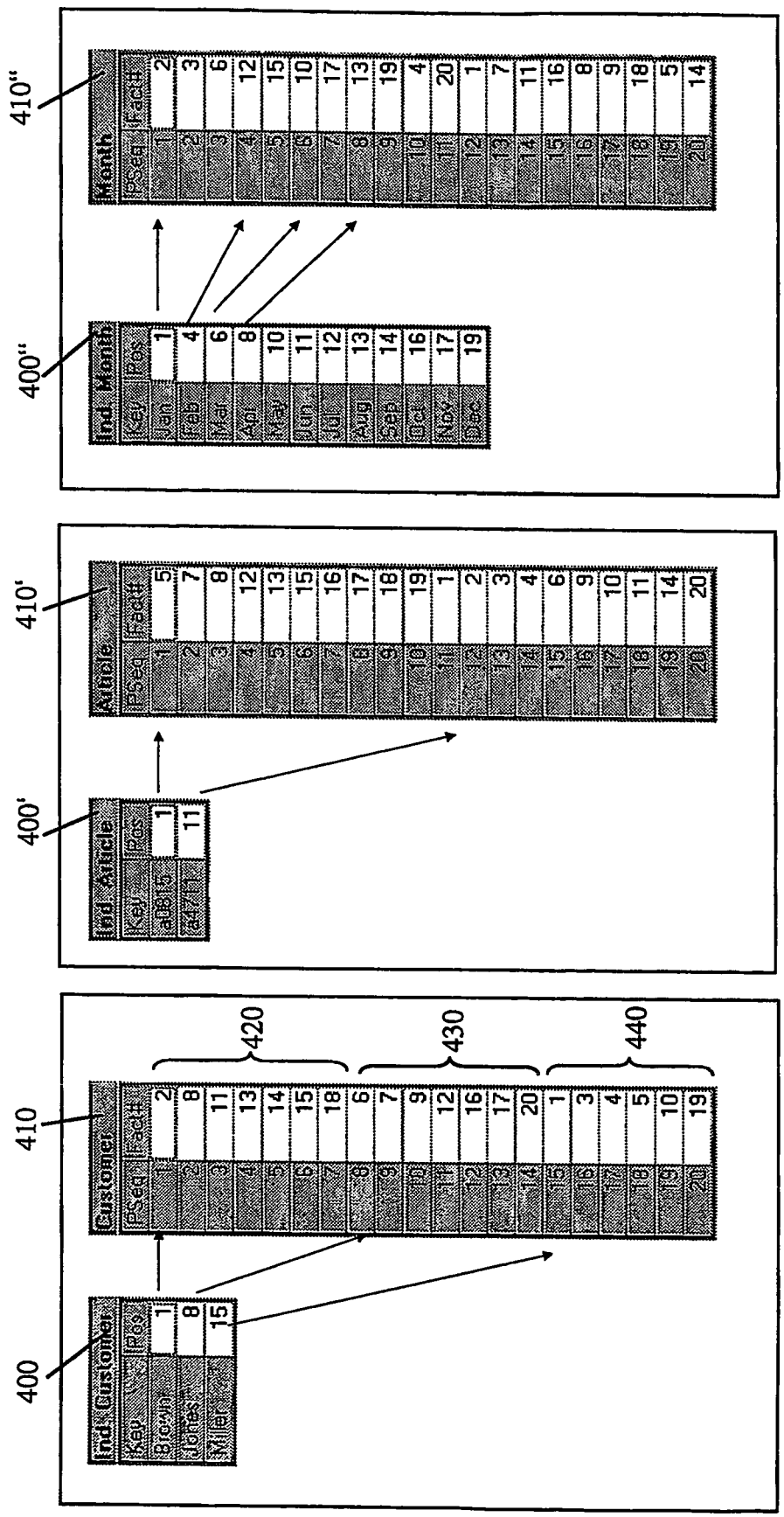
FIG. 4$a$-$c$ illustrate typical vector operations for generating a sequence vector in accordance with the present invention.

In the following it is illustrated how, for a given real facts quantity, which in most cases is represented by a two-dimensional real facts table, an arbitrary pivot-table (cross-table) view is generated in accordance with the invention. It is emphasized that the underlying pivot table generation mechanism can be used also for generation of m-dimensional matrix presentations for n-dimensional data sets. In addition, the mechanism can be implemented with minimum cost and time efforts and requiring only minimum computing resources and thereupon allows for a high performance generation.

It is assumed herein that the real facts quantity includes data keys, each data key defining a key dimension, and data values contained in each key dimension. A pivot view of that facts quantity is given by user-chosen ordered arrangement of the key dimensions, the arrangement of the key dimensions in a presented dimension of the pivot view and a possible aggregation level, as illustrated in more detail in the following.

Such an exemplary facts quantity, in the present case represented by a real facts table, and an exemplary pivot view for that real facts table are shown in FIGS. 1a and 1b. In this example, the real facts table comprises sales figures 130 arranged in key dimensions 'Customer' 100, 'Article' 110 and 'Month' 120. The corresponding exemplary pivot view shown in FIG. 1b presents the (facts) data values 140 of the real facts table shown in FIG. 1a in the order 'Customer'/'Article'/'Month' 150-170 (the depicted left three columns) as overall sums of the sales (right column) 140. Hereby the key dimensions 'Customer' 150 and 'Article' 160 are presented in the vertical direction wherein the key dimension 'Month' is aggregated into calendar quarter values 'Q1'-'Q4' 170 and presented in the horizontal direction of the pivot view.

The underlying mechanism for generating such a pivot view is based on the concept, to reduce each arbitrary pivot presentation chosen by the user into a continuously ordered arrangement of data values (e.g. a sequence vector) of the underlying facts quantity. A preferred embodiment of that mechanism is illustrated by way of FIGS. 2a-c.

In the present embodiment, as depicted in FIG. 2a, the underlying real facts table, at first, is extended by continuous index values 200 (left column) that provides a continuous numbering of the facts from '1' to '20' in the present example. In the resulting pivot view shown in FIG. 2b, in each cell 210 the indices of those facts are presented which sales value has to be summed-up in the corresponding cell.

As mentioned beforehand, the pivot view shown in FIG. 2b is generated on the basis of a sequence vector. The underlying sequence vector for the pivot view in FIG. 2b is depicted in FIG. 2c and consists of two columns 260, 270, the left column 260 containing continuous numbers from again '1' to '20' in the present example and the right column 270 containing the pre-mentioned index values 275 depicted in FIG. 2a in an ordered arrangement that enables sequentially building-up the pivot view of FIG. 2b.

For a better understanding of that sequence vector, the content of the sequence vector is illustrated in the reverse direction, i.e. starting from the pivot view depicted in FIG. 2b. Thus, summing-up the indices line for line and from the left to the right in the cells 210 of the pivot presentation, as indicated in the first two lines of the pivot view by arrows 250, one gets the sequence vector depicted in FIG. 2c.

As mentioned beforehand, a pivot view is generated only with vector operations, the underlying vectors containing only integer values. A considerable performance gain is therefore achieved insofar as none of the following described processing steps uses actual data key values like a literal key value, text or any other real facts value. In all these processing steps, only the mentioned integer (reference) values are used. Only when having finished these integer processing steps, the reference values contained in the resulting sequence vector are transformed back to the corresponding real facts values by means of the later described assignment or reference (look-up) tables.

Figures 3A, 3B, 3C:
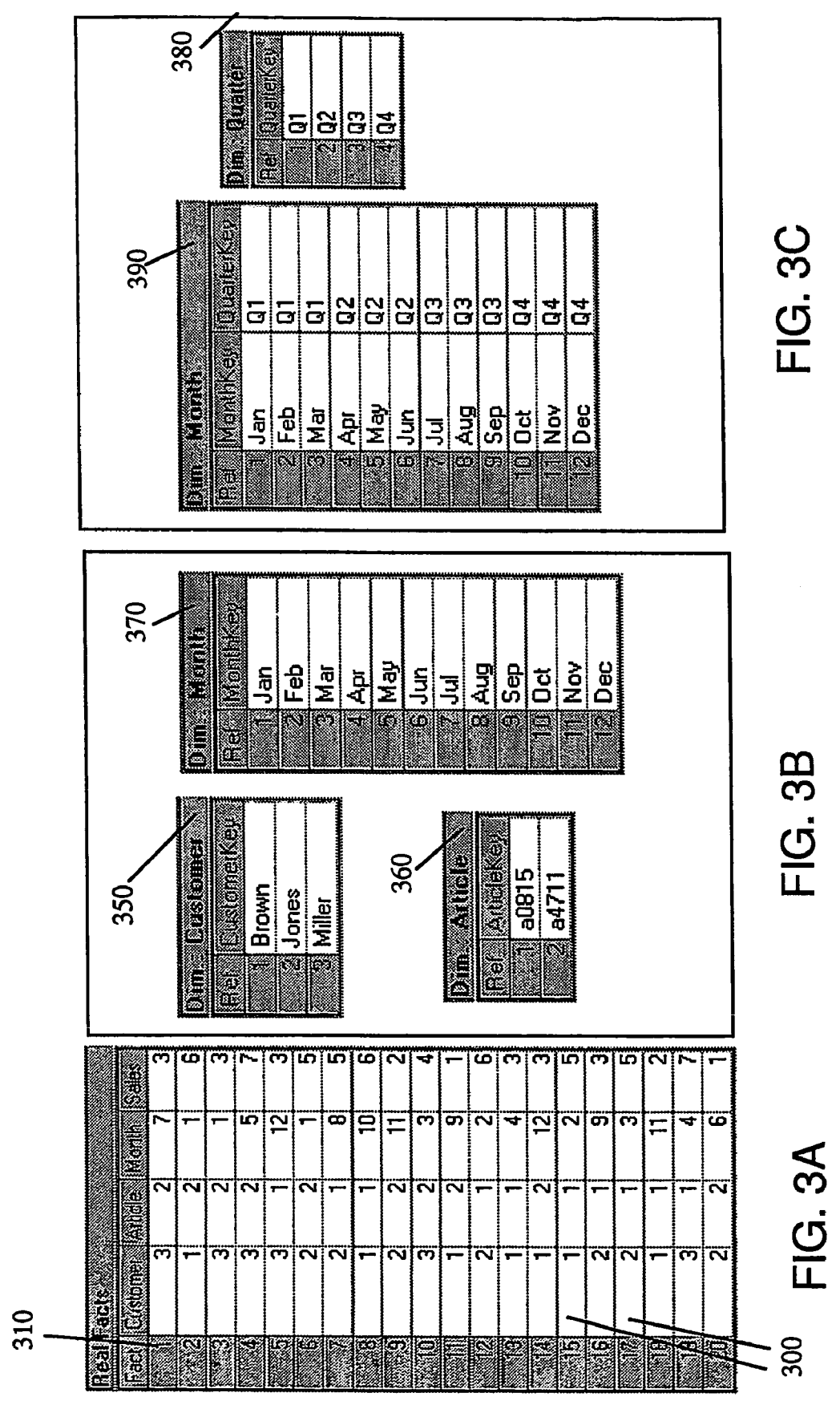

In a first step, as illustrated by the real facts table depicted in FIG. 3a, all data of the different key dimensions contained in the facts table, like the customer names 'Miller' and 'Brown', are replaced by a unique reference value 300 in that key dimension, wherein these unique reference values are used as placeholder values. The facts quantity of the exemplary real facts table shown in FIG. 2a, after transition to the mentioned reference numbers, is shown in FIG. 3a.

The underlying mechanism for that transition to the reference numbers is illustrated in FIG. 3b. It is based on a number of assignment (or reference) tables 350-370 used to assign the real facts of the different key dimensions to the mentioned reference values in the way of the known look-up table mechanism. This is illustrated in FIG. 3b for the key dimensions 'Customer' 350, 'Article' 360 and 'Month' 370. A further key dimension 'Quarter' 380, as illustrated in FIG. 3c, is used as aggregation hierarchy to enable further aggregations for the key dimension 'Month' 390.

For every key dimension of the real facts table depicted in FIG. 2a, a first integer vector 410 provides the sorting order of the facts of the underlying facts column, in relation to the respective key dimension and the occurrence of the elements (reference values) within the key dimensions. A second integer vector 400 provides a First Block Element (FBE) indicating, for each occurrence of a key dimension element (e.g. 'Brown'), the first element of its corresponding block within the sorting sequence 410. This is illustrated in the drawing now referring to FIGS. 4a-4c. Hereby the tables depicted left hand in FIGS. 4a-4c provide, for each key dimension, the reference index of the first entry in the right hand presented ordering vector. Thus exemplary for the key dimension 'Customer' shown in FIG. 4a, all fact numbers 420 for the key 'Brown' are arranged in lines 1 to 7, all fact numbers 430 for the key 'Jones' in lines 8 to 14 and all fact numbers 440 for the key 'Miller' from line 15 to the end of the table.

The necessary steps for obtaining the first integer vector 410 containing the sorting order and the second integer vector 400 containing the First Block Element index are described in more detail at the end of the description.

It is noteworthy that the according presentation for the key dimension 'Quarter' can be derived easily from the vector for 'Month' and is thus not described herein.

Referring now to FIG. 5 and FIGS. 6a-6g it is described in the following how the real facts data are sorted using the pre-mentioned integer vector calculation technique in order to obtain a desired pivot view. Starting with a pre-sorting step, which provides a first block-wise sorting of the facts being used for the final sorting, the sorting is calculated step-by-step, i.e. per key dimension of the pivot presentation, within these blocks in order to reveal the final sorting order. By these processing steps, per key dimension to be sorted, new groups are generated which serve as a basis for the following sorting step and for providing at the end of the calculation the contents of the cells of the pivot presentation.

Figure 5:
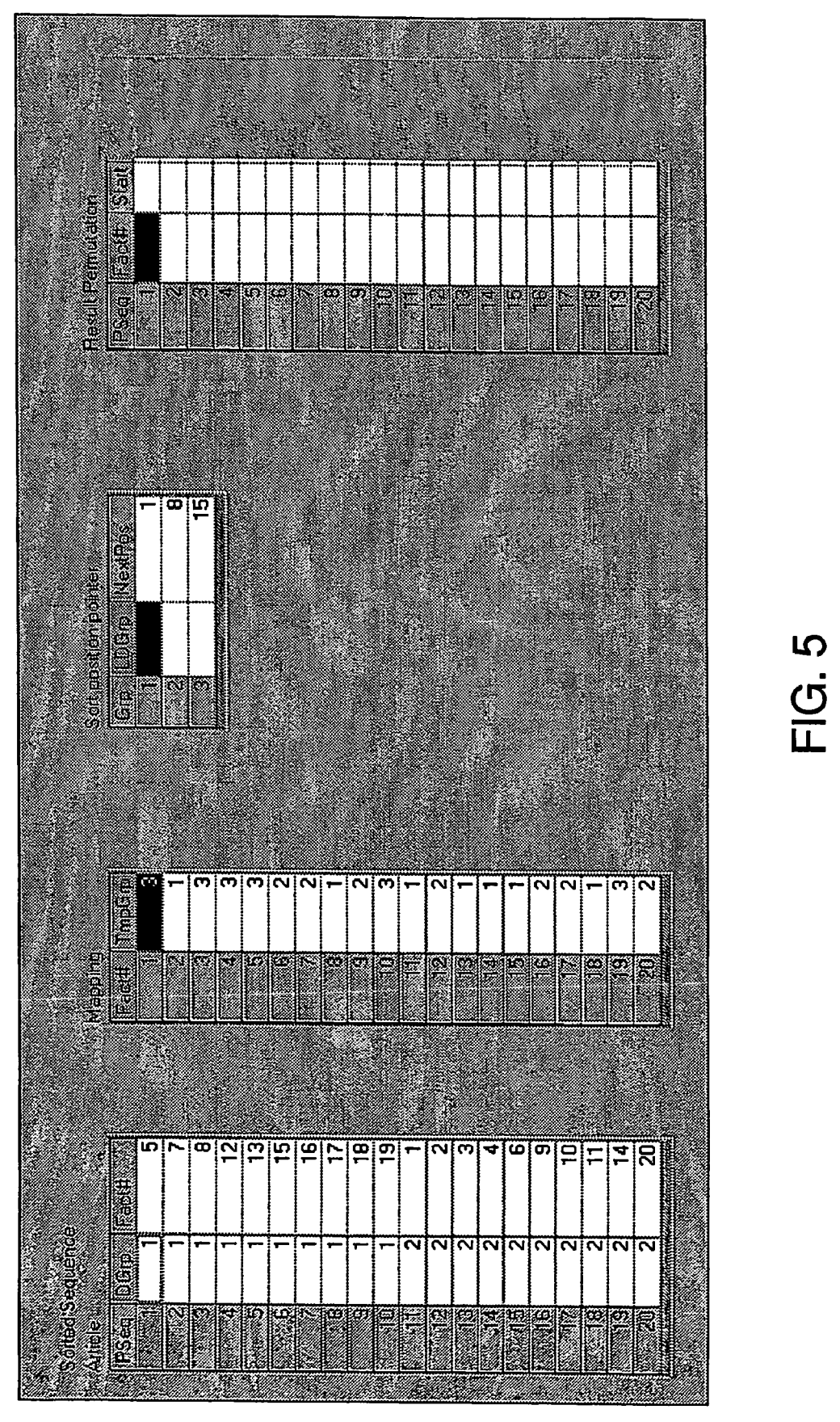

In the present example the pre-sorting blocks are revealed through sorting of the key dimension 'Customer'. Based on the related vectors, the tables shown in these Figures designated "Mapping' and 'Sort position pointer' are initialized as illustrated in FIG. 5. It is emphasized that the tables shown in FIG. 5 are only a snapshot depicting the particular sorting steps 'Customer' by 'Article' of the entire sorting process 'Customer'-by-'Article'-by-'Quarter'. It is to be mentioned that all these tables are processed recursively wherein, at the end of each sorting step, the facts contained in the 'Result Permutation' table in the field 'Fact# NewGrp' are re-used in the 'Mapping' table and 'Sort Position Pointer' table during the respectively next sorting step. However, for initializing these tables prior to a first sorting step, the columns of the 'Mapping' table and the 'Sort Position Pointer' table are initialized as follows.

Each field of the 'TmpGrp' column of the 'Mapping' table is filled with a first dimension of a sorting sequence, in the present case 'Customer', i.e. using the pre-mentioned unique reference values 300 of the 'Real Facts' table. In addition, each field of the 'NextPos' column of the 'Sort Position Pointer' table is initialized using the 'Pos' column of the pre-mentioned FBE table 400 of the corresponding dimension.

During all sorting steps, the 'Fact#' column of the 'Sorted Sequence' tabled is filled with the 'Fact' column of the 'Sorted Sequence' table of the corresponding dimension 410, i.e. a right-hand dimension in the corresponding sorting sequence step. As a consequence, the contents of 'Result Permutation' are erased after the two pre-mentioned initialization steps so that these fields can be newly filled in during the next sorting step. The number of lines in that table equals the number of facts contained in the real facts table. The processing steps conducted in the following are determined by the sorting order related to the key dimension 'Article' which is designated 'Sorted Sequence' in the Figures.

The sorting mechanism itself is illustrated in more detail in the picture sequence shown in FIGS. 6a-6g. Each of these pictures shows a single sorting step, the whole sequence of sorting steps shown in that sequence thus depicting only part of the entire sorting procedure. The whole procedure is based on inter-linkage of the shown four tables.

At first the table for the key dimension 'Article' being designated 'Sorted Sequence' resulting from the previous sorting step for the key dimension 'Customer' is processed in the order of the parameter 'Pseq' from '1' to '20'. In particular, for each of the fact numbers contained in column 'Fact#', in the mapping table a corresponding index designated 'TmpGrp' is determined.

Figure 6A:
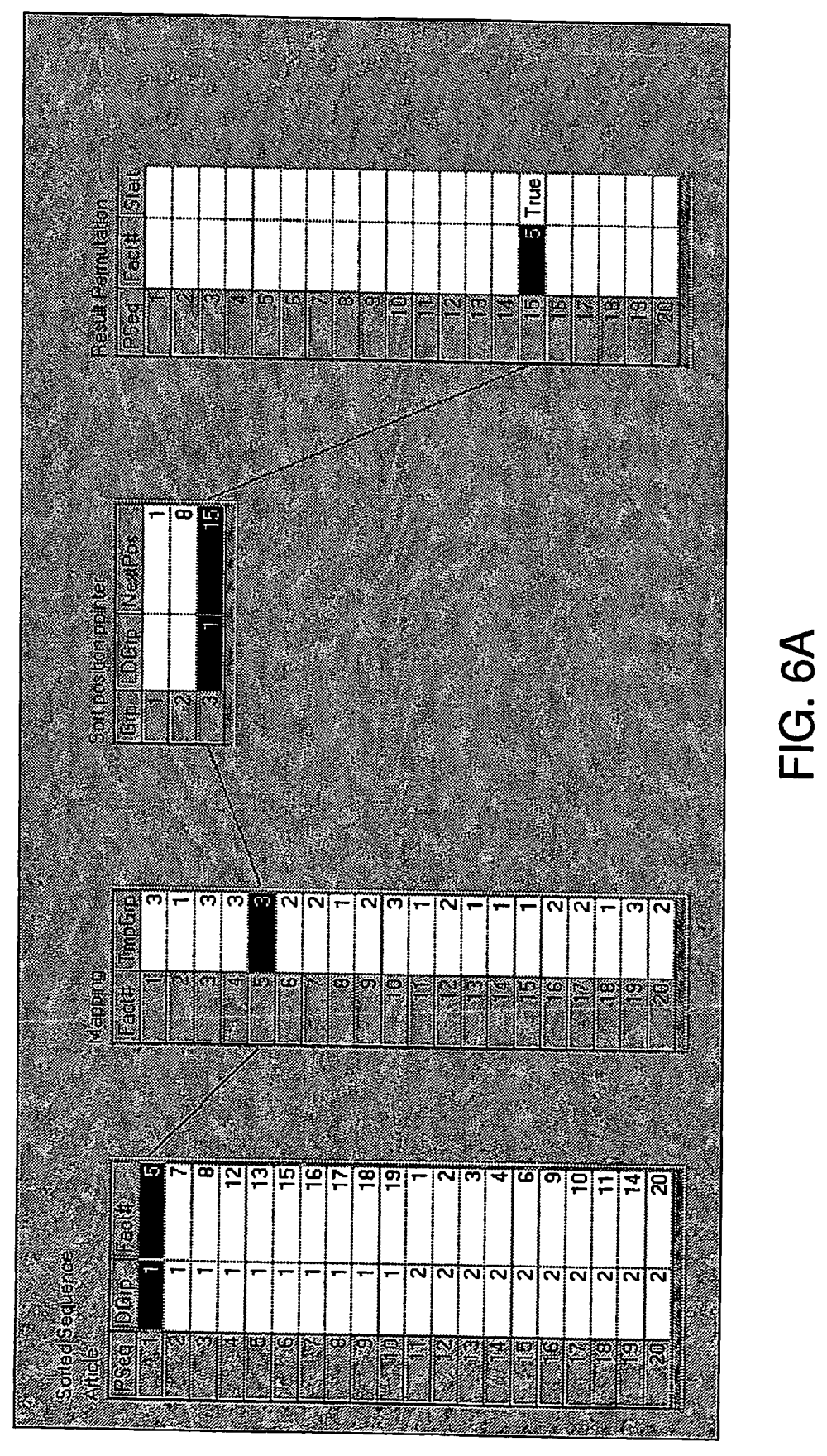
Figures 6B, 6C, 6D:
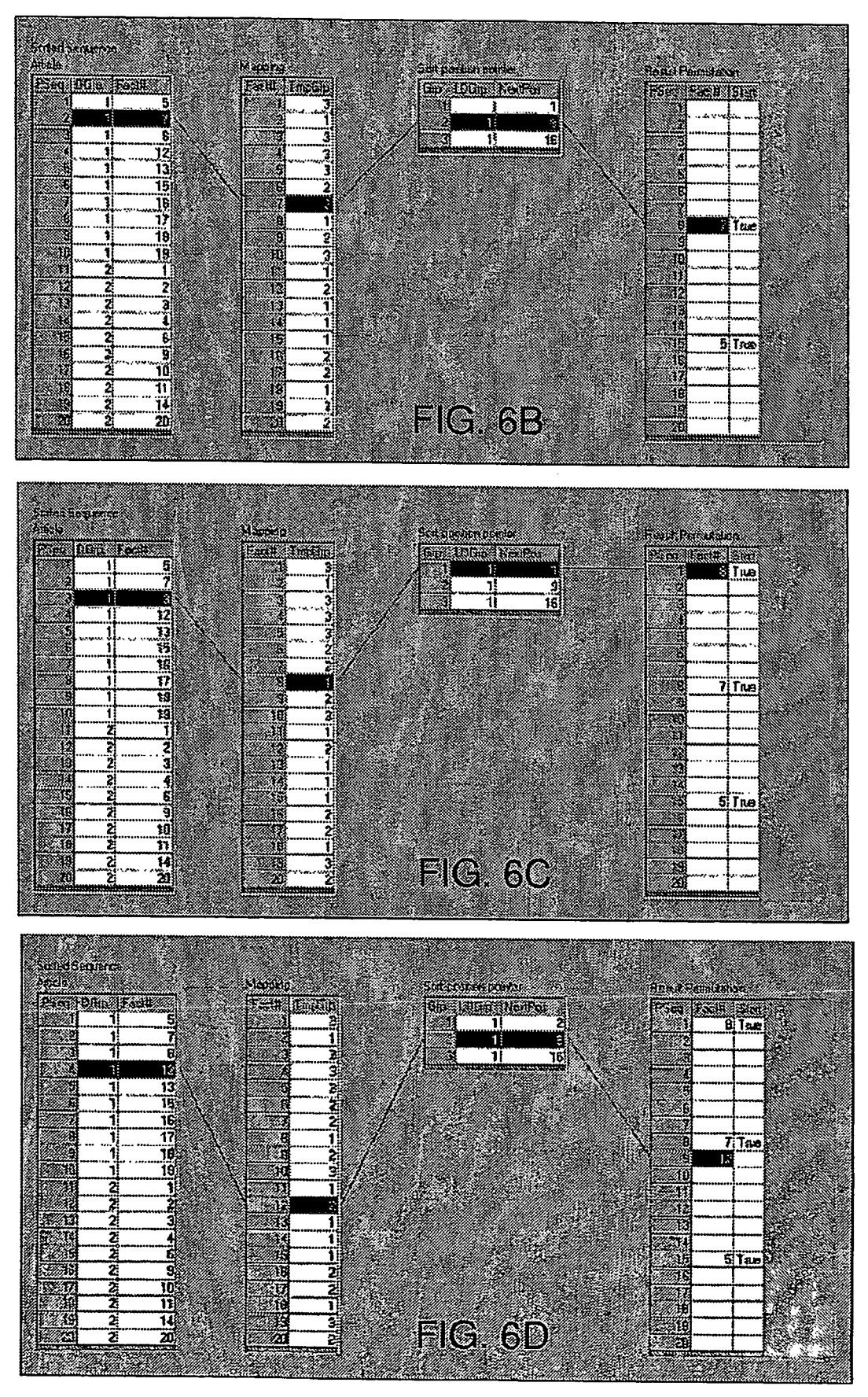

The resulting index, in the sorting step shown in FIG. 6a particularly the resulting integer value '3', is used in a 'Sort position pointer' table to determine a value for the next position 'NextPos', i.e. a target index in a resulting permutation table, by which the value of the current fact number can be identified. Further, the corresponding value contained in the column 'LDGrp' of the mapping table is compared with the corresponding value 'DGrp' contained in the 'Sorted Sequence' table. If both values are distinct, this index is marked 'TRUE' in the column 'Start' of the 'Result Permutation' table thus defining the beginning of a new group. It should be mentioned that in FIG. 6a the parameter 'NextPos', in the shown status of the procedure, has not yet been incremented.

Figures 6E, 6F, 6G:
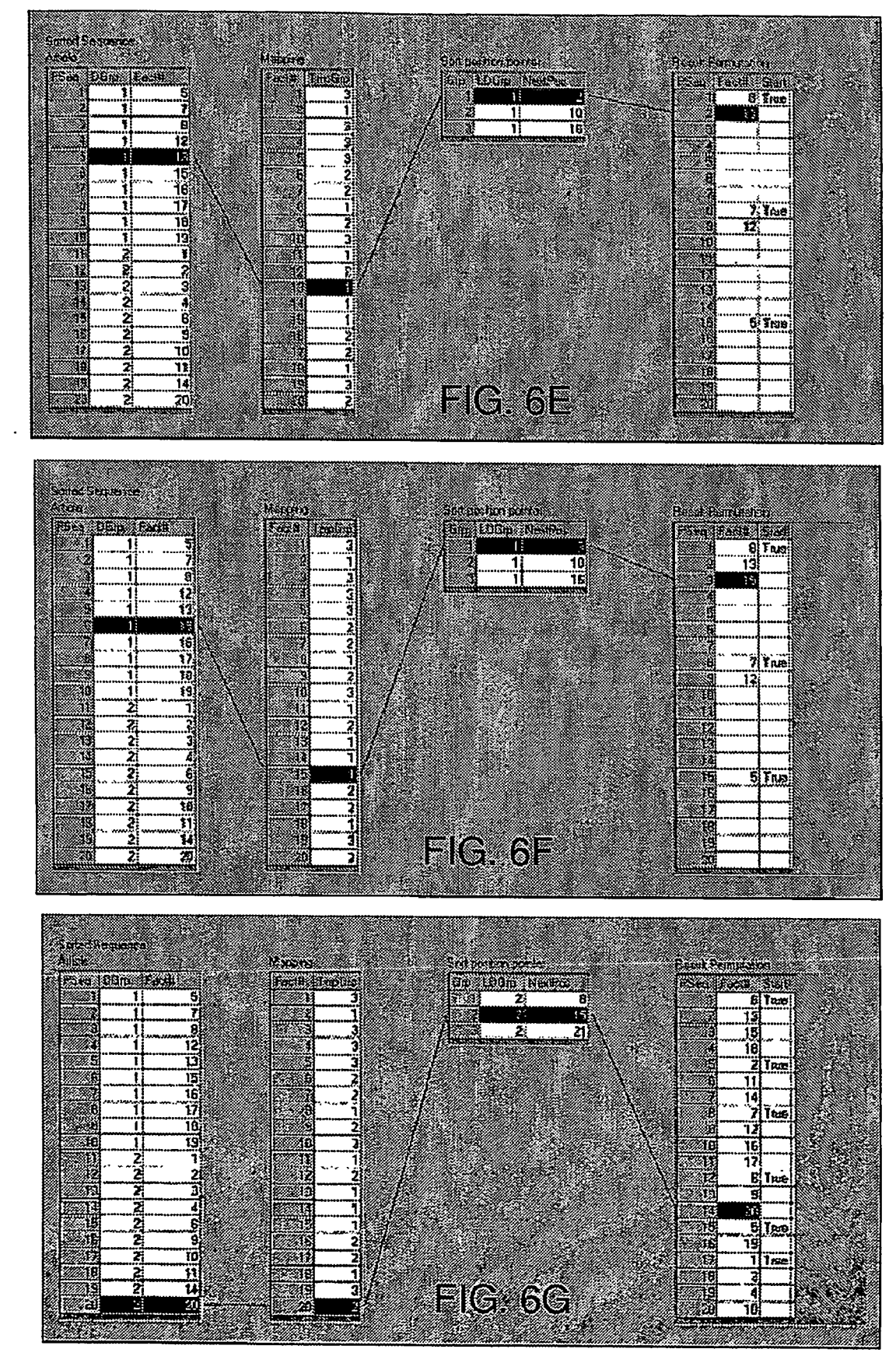

The FIGS. 6b-6f show the further five steps and, omitting steps 7-19, and FIG. 6g the finally obtained Permutation table (vector) designated 'Result Permutation'. Hereby the result of sorting steps for 'Customer' by 'Articles' is stored in the 'Fact#' column of the 'Result Permutation' table shown in FIG. 6g.

Figures 7, 8:
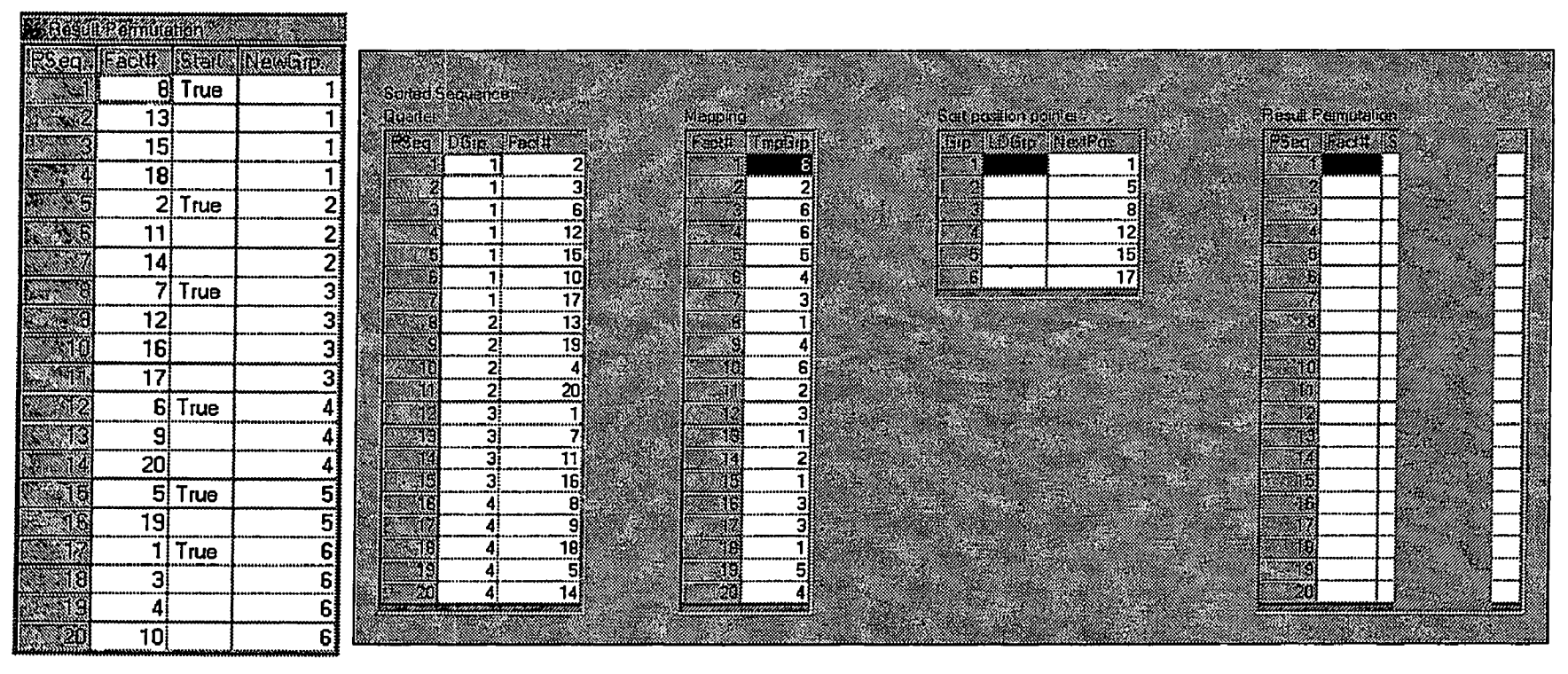

In FIG. 7, the final Result Permutation table depicted in FIG. 6g is shown again. It represents the targeted pivot sequence in the concerning sorting sequence. In the column 'NewGrp' each row is assigned a value by incrementing the group index by one, starting with the first row. That building of increments is done if in the column 'Start' the respective line is marked with the Boolean value 'TRUE', i.e. marked as starting point for a new group. These groups relate to the possible different combinations for the key dimensions 'Customer' and 'Article' which are provided by the real facts. The reference numbers corresponding to these groups within the key dimensions which provide access to the respectively underlying key texts required for the final presentation of the real facts, can be easily determined and managed during execution of the above procedure.

Further referring to FIG. 8, initialization of the next sorting step 'Customer'-by-'Article'-by-'Quarter', starting from the result of the previous sorting step 'Customer' by 'Article', is illustrated. It is mentioned that an additional aggregation step is included where the dimension 'Month' is aggregated to 'Quarter'. The 'NextPos' column of the 'Sort Position Pointer' table is initialized by the corresponding 'PSeq' number of occurrence of an indication value, in the present embodiment a Boolean 'TRUE' value in the 'Start' column of the 'Result Permutation' table.

Starting from the 'Fact#' column of the 'Result Permutation' table, each field of that column is used as an entry point for filling in the 'TmpGrp' column of the 'Mapping' table depicted in FIG. 8 with a corresponding value in a 'NewGrp' field of the 'Result Permutation' table.

Figure 9A:
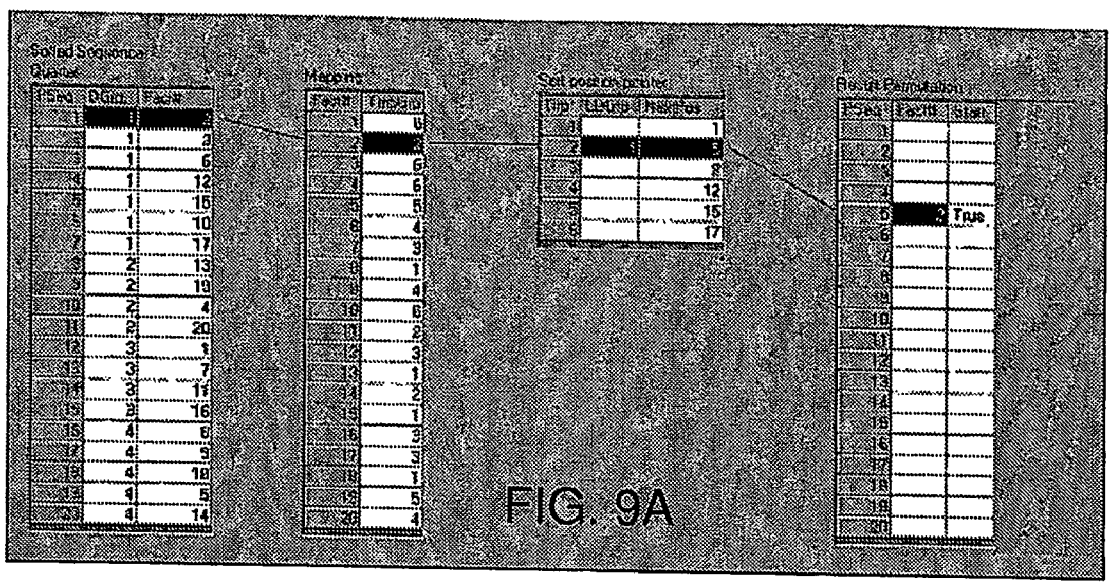
Figure 9B:
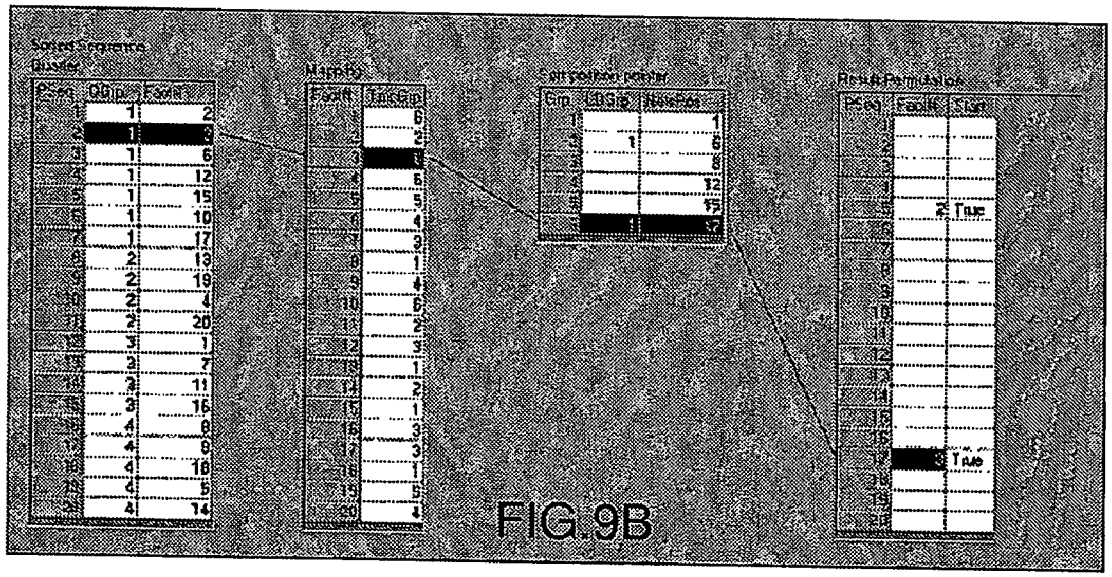
Figure 9C:
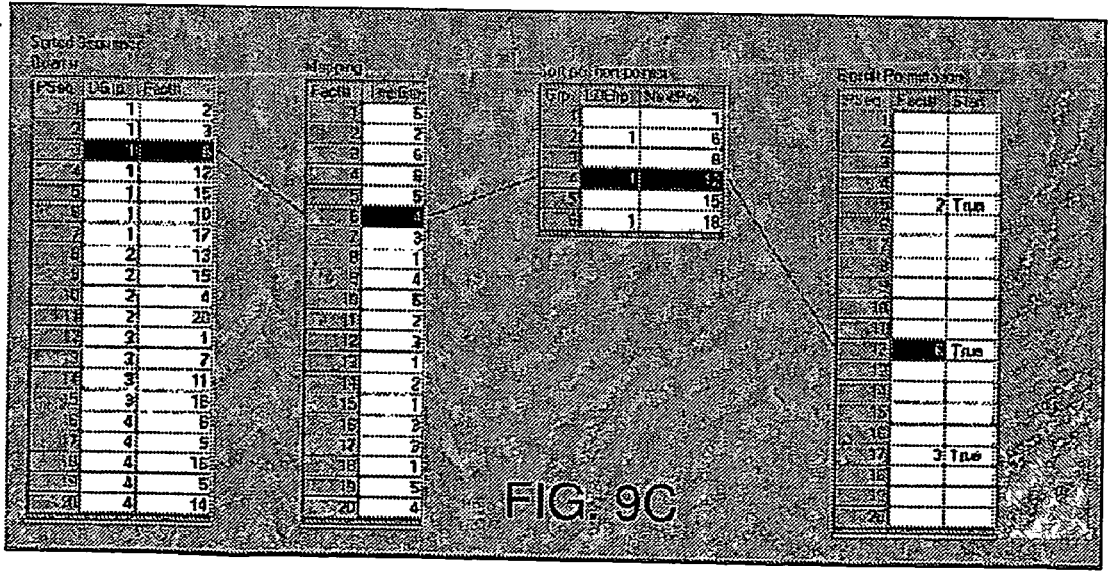
Figures 9D, 9E, 9F:
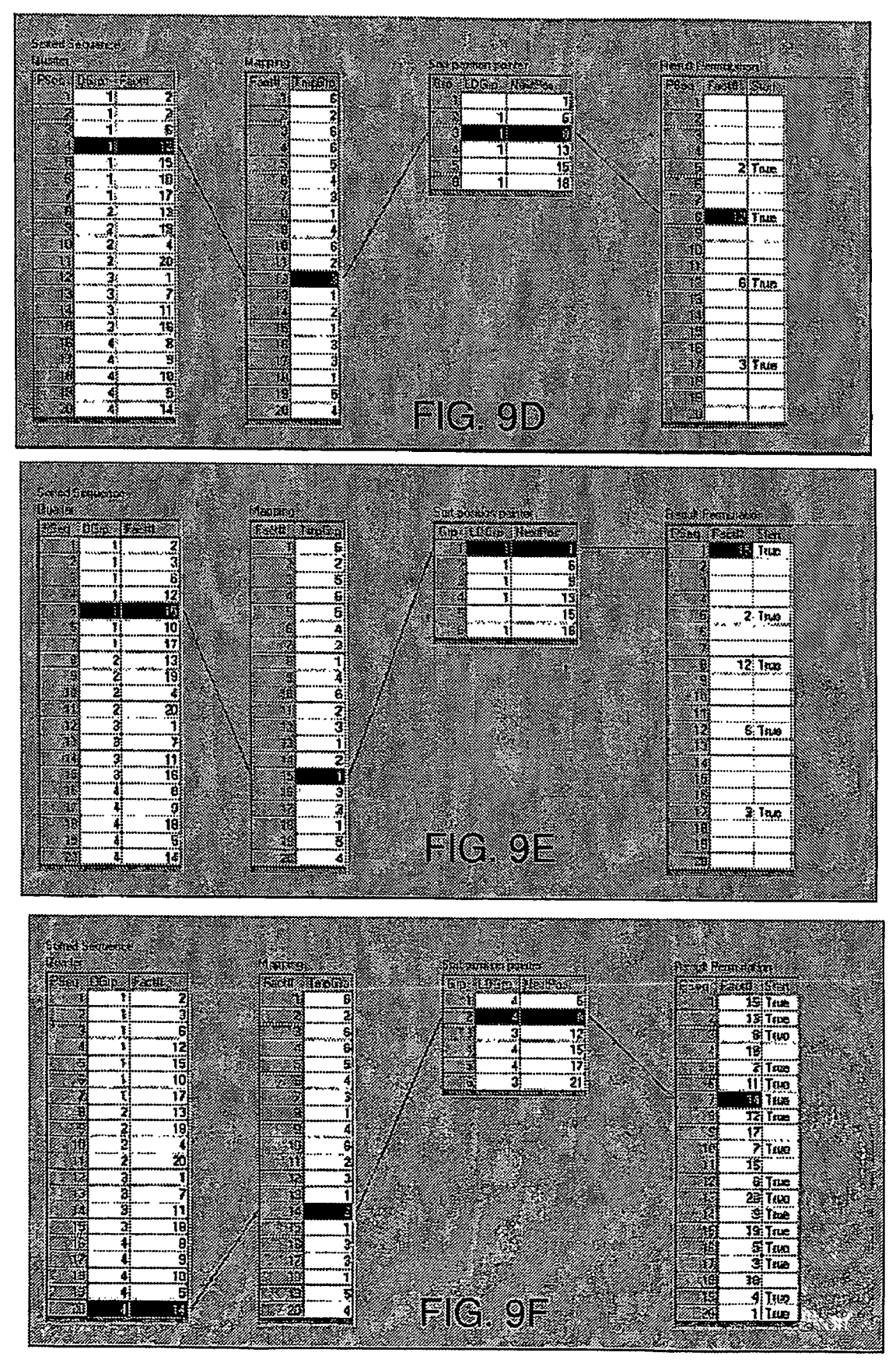

In FIGS. 8 to 10 the final sorting step of the present embodiment is illustrated in accordance with the preceding Figures thus revealing the final pivot presentation. Hereby based on the fact number provided in column 'Fact#' and the group index provided in column 'NewGrp', another corresponding 'Mapping' table and 'Sort Position Pointer' are initialized again, as previously described, which enable the next sorting sequence for the key dimension 'Quarter'. The resulting tables for this initialization are depicted in FIG. 8. In FIGS. 9a-f the first five steps and the last sorting step of the final sorting sequence are shown. These pictures correspond to the similar FIGS. 6b-g and thus are not described in more detail herein.

The whole sorting procedure is finalized with calculation of the 'Pivot Sequence' table depicted in FIG. 10. The entire procedure thus reveals an order sequence vector for the present pivot presentation for the ordered key dimensions 'Customer'-by-'Article'-by-'Quarter'. This order sequence vector is stored in the 'Fact#' column of the 'Result Permutation' table. The underlying group indexes provided in column 'NewGrp' relate to the corresponding cells of the underlying pivot presentation or view. The further corresponding fact references can be determined easily, based on the respective entries in column 'Fact#'.

The above given example consists of only one key dimension which is used for the horizontal specification of the pivot view. It should be mentioned that the sorting procedure is not limited to any amount of key dimensions, which are used for the pivot specification.

The overall procedure is to determine a separate sorting sequence for each pivot dimension. The overall sequence is generated by applying the sorting procedure on the separately generated sequences starting with the result of the first and taking the next as the input for the 'Mapping' table and 'Sort position pointer' table as described above.

The entire sorting process does also work for a subset of the 'real fact' table shown in FIG. 3a. It should be mentioned that the number of rows of the 'mapping' table shown in FIG. 5 corresponds to the maximum possible value of the 'Fact#' column in the 'Sorted Sequence' table, i.e. the number of fact rows of the 'real fact' table. In the case that just a subset of the facts shall be used for the sorting process, e.g. due to filter criteria, the size of the 'mapping' table can be reduced to the size of the selected facts. This can be achieved when each above described initialization of the 'Fact#' column of the 'Sorted Sequence' table uses the relative index of a real fact index within the corresponding subsequence. The result of the sorting process is stored in the 'Fact#' column of the 'Result Permutation' table, which needs to be transferred back to the real fact index.

As it is described above, the 'First Block Element' (FBE) integer vector 400 and the 'sorting order' integer vector 410 are used for the initialization of each sorting step. The LBE index vector is calculated on a key dimension column 310 of the 'Real Fact' table shown in FIG. 3a. As a first step, said count vector is calculated wherein each field of the count vector contains the number of occurrences of the corresponding reference number of the corresponding key dimension in the 'Real Fact#' table. Each value in the count vector reflects the length of the block for the corresponding reference number. Processing the count vector from the first field to the last field adding up the values provides, for each step, the start of a corresponding group. The result of this is stored in the FBE index vector 400.

The 'sorting order' integer vector 410 is calculated using the sorting procedure. In this case the 'DGrp.' column of the 'Sorted Sequence' table is filled in each field with the same value e.g. '1'. Each field of the 'Fact#' column is filled with the corresponding value of the 'PSeq' column. Each field of the 'TmpGrp' column of the 'Mapping' table is filled with the values of the corresponding dimension key shown in FIG. 3a. The 'NextPos' column of the 'Sort position pointer' table is filled with the 'FBE' integer vector 400 of the corresponding dimension key. Performing the sorting procedure on this initialization provides the 'sorting order' integer vector 410 in the 'Fact#' column of the 'Result Permutation' table.

It should be mentioned that the same procedure is used when a hierarchy level e.g. 'Quarter' is used within the current pivot specification. The 'FBE' and 'sorting order' integer vectors can be calculated when the real fact column of the corresponding dimension key e.g. 'Month' is converted to the reference numbers of the hierarchy level.

Finally referring back to FIGS. 2b and 7, it is described in more detail how said entry points are calculated according to the invention. The cardinality of the final pivot presentation, e.g. the number of columns and rows in a 2-dimensional pivot presentation, is another result of the sorting procedure. For each said dimension of the pivot view, the cardinality of the corresponding pivot view dimension depends on the pivot specification and the facts which are the input of the pivot view. In the given example, the cardinality of the vertical dimension can be derived after the sorting step of 'Customer'-by-'Article'. The last field of the 'NewGrp.' column of the 'Result Permutation' table (see FIG. 6g) contains the number of resulting groups. This number is equivalent to the cardinality of the vertical dimension of the resulting pivot view. Thus proceeding each pivot dimension independently provides the needed cardinality of the corresponding pivot dimension.

The invention claimed is:

1. A computer-implemented method for generating an n-dimensional matrix presentation of at least part of an m-dimensional database comprising data records and a plurality of key dimensions, each key dimension comprising a plurality of data value fields, each data value field having real data therein, said method comprising:
    calculating a sorting sequence of fact numbers, said fact numbers identifying the data records;
    calculating entry points for each dimension of the n-dimensional matrix presentation, each calculated entry point calculated to be linked with a corresponding fact number of the sorting sequence;
    calculating a cardinality of the n-dimensional matrix presentation in dependence on the calculated sorting sequence and the calculated corresponding entry points; and
    generating the n-dimensional matrix presentation based on the calculated cardinality and the calculated entry points.

2. The method of claim 1, wherein calculating the entry points comprises placing each fact number of the sorting sequence into its corresponding calculated entry point within a column associated with the n-dimensional matrix presentation.

3. The method of claim 2, said method further comprising:
    prior to calculating the entry points, transforming the real data of each data value field to corresponding index values;
    calculating the entry points using the index values and not using the real data;
    after calculating the entry points and prior to generating the n-dimensional matrix presentation, transforming the index values back to the real data for generating the n-dimensional matrix presentation.

4. The method of claim 3, wherein calculating the entry points comprises executing a sequence of linear vector operations on the sorting sequence and on the index values.

5. The method of claim 4, said method further comprising:
    generating a reference table comprising a column that includes the sorting sequence of fact values and columns including the index values of each key dimension;
    generating, based on the reference table, a sorted sequence table correlating the sorting sequence with the index values of the first key dimension, said sorted sequence table having the index values of the first key dimension sorted therein;
    generating, based on the reference table, a mapping table correlating the index values of a second key dimension of the plurality of key dimensions with the sorting sequence; and
    generating, based on the reference table, a sort position pointer table comprising a count vector whose elements are pointers that point to selected entry points of said entry points, said selected entry points being a function of a count of a total number of distinct data records of the database for each unique index value of the second key dimension.

6. The method of claim 5, wherein executing the sequence of linear vector operations comprises sequentially executing first, second, and third vector operations for each fact number of the sorting sequence in the sorted sequence table, said each fact number being denoted as a given fact number, wherein the first linear vector operation links the given fact number to a corresponding index value of the second key dimension in the mapping table;

wherein the second linear vector operation links the corresponding index value of the second key dimension, resulting from execution of the first linear vector operation, to a corresponding pointer of the count vector of the sort position pointer table, and following execution of the second linear vector operation the corresponding pointer in the count vector is incremented so as to point to a next entry point of said entry points; and wherein the third linear vector operation uses the corresponding pointer prior to being incremented, resulting from execution of the second linear vector operation, to point to the entry point corresponding to the given fact number.

7. The method of claim 3, wherein the index values of a first key dimension of the plurality of key dimensions is represented by a vector.

8. The method of claim 3, wherein the index values are integers.

9. The method of claim 1, wherein said generating comprises generating a pivot view pertaining to the n-dimensional matrix presentation.

10. The method of claim 1, wherein said generating comprises generating a virtual n-dimensional matrix pertaining to the n-dimensional matrix presentation.

11. The method of claim 1, wherein n is equal to m.

12. The method of claim 1, wherein n is unequal to m.

* * * * *